United States Patent Office 3,003,000
Patented Oct. 3, 1961

3,003,000
ORGANIC PEROXIDES
Nicholas A. Milas, Belmont, Mass., assignor to Research Corporation, New York, N.Y., a corporation of New York
No Drawing. Filed July 1, 1959, Ser. No. 824,219
8 Claims. (Cl. 269—610)

This invention relates to novel organic peroxides and methods of making them.

The novel peroxides of the invention have the general formula

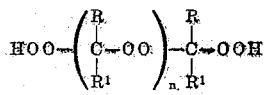

wherein R and $R^1$ are lower alkyl groups and $n$ is a whole number from 0 to 5.

The peroxides of the invention are useful as catalysts in polymerization reactions and as accelerators of diesel fuel combustion, and are also useful in the preparation of other organic compounds derived therefrom.

The compounds of the invention are obtained by the action of hydrogen peroxide on dialkyl ketone in which the alkyl groups may be the same or different. In general, the presence of hydrogen ions favors the formation of the higher members of the series illustrated in the foregoing structural formula. It is believed that at least in part the compounds of the invention are formed by the following sequence of reactions:

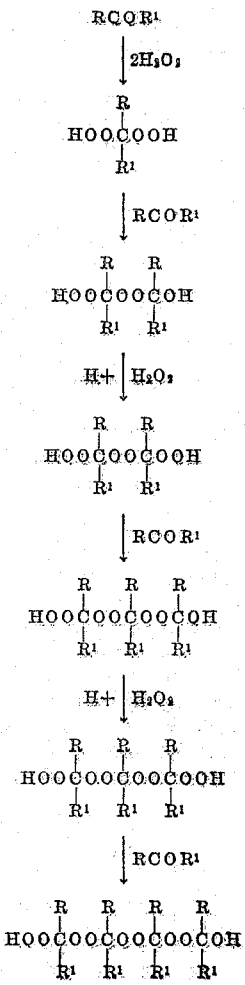

and so on.

Side reactions leading to cyclic condensation products such as

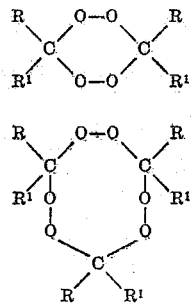

may also occur.

Separation of the products of the reaction of hydrogen peroxide and dialkyl ketones can be effectively accomplished by chromatography on cellulose powder columns. Particularly suitable as an elution solvent for such chromatographic separation is a normally liquid alkane, such as pentane, saturated with dimethylformamide.

The principles of the invention are illustrated in the following examples:

2,2-dihydroperoxypropane (IA)

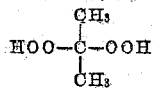

To 11.3 cc. (0.2 mole) of 50% hydrogen peroxide cooled to 0° C. was added dropwise in the course of one hour with stirring 14.7 cc. (0.2 mole) of acetone. Stirring was continued at 0° for three additional hours then 50 cc. of ether was added and the mixture was shaken with 2 x 50 cc. of saturated solution of ammonium sulfate solution followed by 2 x 10 cc. of water. The final mixture was dried over magnesium sulfate, filtered and the ether removed in vacuum. The viscous residue (2.4 g.) failed to crystallize but it gave a single spot on a paper chromatogram with an $R_f$ of 0.01 and was different when compared against hydrogen peroxide.

Analysis.—Calcd. for $C_3H_8O_4$: (O), 29.60; mol. wt., 108.1. Found: (O), 29.10 ($KI+CH_3COOH$ method); mol. wt., 115 (in exaltone).

The infrared spectrum 10% in chloroform showed the following bands in cm.$^{-1}$; the intensity of each band is given in parenthesis: 3400 (8); 2990 (4); 2980 (3.5); 2800 (2.5); 1610 (2.5); 14.60 (4.5); 1365 (8.5); 1340 (5.5); 1255 (5.5); 1195 (5.5); 1160 (8.5); 1035 (2.5); 940 (3); 875 (4); 830 (7.5).

Using the procedure of Brewster and Cotte, Jr. (JACS, 77, 6214 (1955)), the bis-p-nitrobenzoate was prepared, M.P. 129–130° C. (dec.) from methyl alcohol.

Analysis.—Calcd. for $C_{17}H_{14}O_{10}N_2$: C, 50.25; H, 3.47; N, 6.89. Found: C, 50.33; H, 3.46; N, 6.68.

When the reaction between acetone and hydrogen peroxide was carried out at room temperature for 24 hours, the product contained more than 90% of peroxide IA and small quantities of peroxide IIIA.

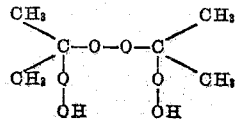

2,2′-dihydroperoxy-2,2′-dibutyl peroxide (IIB)

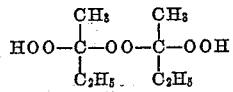

To 13.6 g. (0.2 mole) of 50% hydrogen peroxide cooled to 0° to −5° C. was added with stirring 4.8 g. (0.5 mole) of conc. sulfuric acid. To this solution cooled to −5° was added dropwise in the course of one hr. 14.4 g. (0.2 mole) of methyl ethyl ketone. Stirring and cooling was continued for an additional four hr. period. The cold mixture was then extracted with about 100 cc. of n-petane and the extract shaken with 2 x 30 cc. of saturated ammonium sulfate solution followed by 3 x 50 cc. of water, dried over magnesium sulfate then filtered. A paper chromatogram of the filtrate showed the presence of seven different peroxides when sprayed with hydrogen iodide-acetic acid solution. The filtrate was then cooled to −70° C. and the colorless crystalline solid which separated out was recrystallized three times at low temperatures from pentane and the final crystals sublimed at room temperature under reduced pressure (0.3 mm.). The sublimate gave a single spot on a paper chromatogram with an $R_f$ of 0.187 and a M.P. of 39–42° C. with softening at 30° C.

Analysis.—Calcd. for $C_8H_{18}O_6$: (O), 22.83; M.W., 210.2. Found: (O), 22.54 ($KI+CH_3COOH$ method); M.W., 204 (in exaltone).

The infrared spectrum 10% in chloroform showed the following bands in cm.$^{-1}$; the number in parenthesis gives the intensity of each band: 3400 (8.5); 2990 (6.5); 2980 (5.5); 2800 (3.5); 1460 (7); 1430 (4.5); 1365 (9); 1330 (5); 1290 (4.5); 1250 (5); 1205–1230 (6.5); 1170 (8.5); 1125 (8.5); 1115 (7.5); 1050 (6); 1010 (6.5); 995 (4.5); 915 (6.5); 885 (6.5); 875 (6.5); 860 (6.5).

Using the procedure of Brewster and Cotte, Jr. (JACS, 77, 6214 (1955)), the bis-p-nitrobenzoate of peroxide IIIB was prepared; M.P. 103° (explosive).

Analysis.—Calcd. for $C_{22}H_{24}N_2O_{12}$: C, 51.97; H, 4.76; N, 5.51; (O), 9.44. Found: C, 52.20; H, 4.87; N, 5.32; (O), 9.50.

2,2-dihydroperoxybutane (IB)

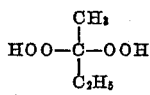

This peroxide is much more soluble in water than in pentane so that a crude reaction product of equimolar proportion of 50% hydrogen peroxide and methyl ethyl ketone at −5° C. in pentane was washed twice with saturated ammonium sulfate solution to remove the unreacted hydrogen peroxide, then extracted several times with water and water extracts combined and extracted with ethyl ether, dried over magnesium sulfate and filtered. The ether was removed under reduced pressure and the oily residue subjected to a high vacuum (0.3 mm.) at 50° C. for 1 hr. The residue showed a single spot on the paper chromatogram with an $R_f$ of 0.012. It was not possible to crystallize this peroxide and it fails to form a crystalline hydrate as in the case of 3,3-dihydroperoxypentane.

Analysis.—Calcd. for $C_4H_{10}O_4$: (O), 26.2; M.W., 122.1. Found: 25.7 ($KI+CH_3COOH$ method); M.W., 120 (in exaltone).

The infrared spectrum 10% in chloroform showed the following bands in cm.$^{-1}$: 3400 (7); 2990 (4); 2980 (4); 1610 (2.5); 1455 (5); 1370 (7); 1355 (5); 1290 (4); 1205–1240 (3.5); 1175 (5); 1130 (7.5); 1090 (4); 1050 (3.5); 1040 (3.5); 1050 (3.5); 995 (3); 945 (2.5); 915 (2.5); 885 (3.5); 845 (6).

The bis-p-nitrobenzoate was prepared and recrystallized from methyl alcohol, M.P. 109° C. (dec.).

Analysis.—Calcd. for $C_{18}H_{16}N_2O_{10}$: C, 51.43; H, 3.84; N, 6.67. Found: C, 51.47; H, 3.89; N, 6.84.

1,4,7-trimethyl-1,4,7-triethyl-1,4,7-cyclononatriperoxane (VIIB)

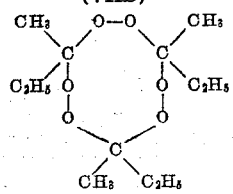

The mother liquors from the crystallization of peroxide IIB were combined and the solvent removed under reduced pressure. The residue was dissolved in methyl alcohol and cooled to −70° C.; a copious white precipitate separated out. This was recrystallized several times from methyl alcohol at low temperatures and the final product subjected to a vacuum (0.3 mm.) at 40° C. for three hrs. to remove traces of methanol; M.P. 30–32° C. with softening at 20° C. This product showed a single spot on the paper chromatogram when sprayed with hydrogen iodide-acetic acid reagent with an $R_f$ of 0.960. This peroxide does not liberate iodine from potassium iodide-acetic acid reagent; it is highly sensitive to shock and explodes with considerable brisance.

Analysis.—Calcd. for $C_{12}H_{24}O_6$: (O), 18.16; M.W., 264.3. Found: (O), 17.80 ($HI—CH_3COOH$ method); M.W., 270 (in exaltone).

This cyclic peroxide is formed only in the presence of hydrogen ion and it must be formed by an ionic rather than a free-radical mechanism.

The infrared spectrum of this peroxide 10% in chloroform showed the following bands in cm.$^{-1}$: 2990 (7.5); 2980 (6.5); 2800 (4.5); 1460 (7.5); 1360 (8); 1325 (5); 1285 (5); 1260 (6.5); 1200–1225 (6); 1170 (9); 1140 (9.5); 1105 (5); 1045 (6); 1010 (7); 990 (5); 910 (7); 885 (7.5); 860 (4).

The following peroxides were separated by chromatography on cellulose powder from the mother liquors from peroxide IIB:

1,4,7,10,13,16-hexamethyl-1,4,7,10,13,16-hexaethyl-1,4,7,10,13-pentaperoxy-1,16-dihydroperoxide (VIB)

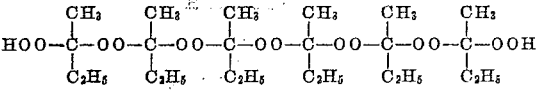

Of the seven peroxides detected by paper chromatography only three were separated by standard procedures. The remaining four peroxides were separated only by the use of a chromatographic column packed with cellulose powder. The technique used has been described in a previous publication (Milas and Golubovic, J.A.C.S. 81, 3361 (1959)). The tube best suited for the separation of the peroxides of this series had the dimensions of 3 x 50 cm. with a cellulose packing of 37 cm. About 2.5–3 g. of the original mixture of peroxides, from which most of peroxides VIIB, IIB and IB had been removed, was dissolved in 5 cc. of pentane and sprayed evenly on the top of the cellulose column. Pentane previously saturated with dimethylformamide was then allowed to flow through the column at the rate of 0.5 cc. per min. and with positive dry air pressure of 50 mm. Twenty cc. fractions were collected and analyzed by means of paper chromatography. Fraction 1 was pure peroxide VIIB; fractions 2–4 were mixtures of VIIB and VIB while fractions 5–8 gave a single spot on the paper chromatogram with an $R_f$ of 0.818. From these fractions was isolated 17.8 mg. of VIB as a highly viscous, highly explosive product which failed to crystallize at −70° either in methanol or pentane.

Analysis.—Calcd. for $C_{24}H_{50}O_{14}$: Mol. wt., 563. Found: mol. wt., 576 (in exaltone).

The infrared spectrum 10% in chloroform is typical of this type of peroxides and showed the following bands in cm.$^{-1}$: 3400 (3); 2990 (4.5); 2980 (4.5); 2800 (3); 1460 (4.5); 1430 (2.5); 1365 (5.5); 1335 (3); 1290 (3); 1260 (4); 1210–1230 (2.5); 1170 (6); 1130 (6.5); 1115

(6.5); 1055 (5); 1010 (5); 995 (4); 920 (3); 875–885 (4.5); 860 (5.5).

1,4,7,10,13-pentamethyl-1,4,7,10,13-pentaethyl-1,4,7,10-tetra-peroxy-1,13-dihydroperoxide (VB)

$$HOO-\underset{C_2H_5}{\underset{|}{C}}-OO-\underset{C_2H_5}{\underset{|}{C}}-OO-\underset{C_2H_5}{\underset{|}{C}}-OO-\underset{C_2H_5}{\underset{|}{C}}-OO-\underset{C_2H_5}{\underset{|}{C}}-OOH$$
(with $CH_3$ on each C)

The fractions (12–16) from the chromatographic separation which gave a single spot on the paper chromatogram with an $R_f$ of 0.640 were combined and the peroxide (28 mg.) recovered and recrystallized at low temperatures from methanol. At room temperature this peroxide is a gum and is highly sensitive to shock and explodes with brisance.

*Analysis.*—Calcd. for $C_{20}H_{42}O_{12}$: (O), 20.23; mol. wt., 474.6. Found: (O), 20.4 (KI+$CH_3COOH$ method); mol. wt., 453 (in exaltone).

The infrared spectrum 10% in chloroform showed the following bands in cm.$^{-1}$: 3400 (4); 2990 (5); 2980 (5); 2800 (3); 1465 (5.5); 1430 (3); 1365 (7); 1335 (4); 1290 (3.5); 1250 (3); 1210–1230 (3); 1170 (6.5); 1130 (7.5); 1115 (7.5); 1055 (5.5); 1010 (5); 995 (4); 920 (4); 870–885 (6); 860 (6.5).

1,4,7,10-tetramethyl-1,4,7,10-tetraethyl-1,4,7-triperoxy-1,10-dihydroperoxide (IVB)

$$HOO-\underset{C_2H_5}{\underset{|}{C}}-OO-\underset{C_2H_5}{\underset{|}{C}}-OO-\underset{C_2H_5}{\underset{|}{C}}-OO-\underset{C_2H_5}{\underset{|}{C}}-OOH$$
(with $CH_3$ on each C)

The fractions (22–33) from the chromatographic column which gave a single spot on the paper chromatogram with an $R_f$ of 0.475 were combined and the peroxide recovered and recrystallized at −70° C. from pentane. The crystals melt at room temperature to give a highly viscous and explosive liquid.

*Analysis.*—Calcd. for $C_{16}H_{34}O_{10}$: (O), 20.71; mol. wt., 386.4. Found: (O), 21.50 (KI+$CH_3COOH$ method); mol. wt., 372.0 (in exaltone).

The infrared spectrum 10% in chloroform showed the following bands in cm.$^{-1}$: 3400 (5.5); 2990 (5); 2980 (5); 2800 (3.5); 1460 (5.5); 1430 (3); 1365 (7.5); 1335 (4); 1290 (3.5); 1250 (3); 1210–1230 (3.5); 1170 (6.5); 1130 (7.5); 1115 (6.5); 1055 (5); 1010 (5); 995 (4); 920 (4); 875–885 (6); 860 (6.5).

1,4,7-trimethyl-1,4,7-triethyl-1,4-diperoxy-1,7-dihydroperoxide (IIIB)

$$HOO-\underset{C_2H_5}{\underset{|}{C}}-OO-\underset{C_2H_5}{\underset{|}{C}}-OO-\underset{C_2H_5}{\underset{|}{C}}-OOH$$
(with $CH_3$ on each C)

The fractions (38–48) from the chromatographic column which gave a single spot on the paper chromatogram with an $R_f$ of 0.278 were combined and the peroxide recovered. This was recrystallized at −70° C. from pentane, but at room temperature it exists as a highly viscous liquid which is sensitive to shock and explodes with brisance.

*Analysis.*—Calcd. for $C_{12}H_{26}O_8$: (O), 21.40; mol. wt., 298.3. Found: (O), 21.10 (KI+$CH_3COOH$ method); mol. wt., 289.0 (in exaltone).

The infrared spectrum 10% in chloroform showed the following bands in cm.$^{-1}$: 3400 (5.5); 2990 (5); 2980 (5); 2800 (3); 1460 (6); 1430 (3.5); 1365 (7.5); 1330 (4); 1290 (3.5); 1250 (3); 1210–1230 (3); 1170 (7); 1125 (8); 1115 (7); 1055 (5); 1010 (5); 995 (3.5); 915 (4); 885 (6.5); 875 (6.5); 860 (6.5).

This peroxide also formed a bis-p-nitrobenzoate, M.P. 77–78° C. from ethyl alcohol.

*Analysis.*—Calcd. for $C_{26}H_{32}N_2O_{14}$: C, 52.34; H, 5.41; N, 4.70. Found: C, 52.66; H, 5.59; N, 4.75.

3,3′-dihydroperoxy-3,3′-dipentyl peroxide (IIC)

$$HOO-\underset{C_2H_5}{\underset{|}{C}}-OO-\underset{C_2H_5}{\underset{|}{C}}-OOH$$
(with $C_2H_5$ on each C)

To 6.8 g. (0.1 mole) of 50% hydrogen peroxide cooled at 0° C. was added with stirring 24 g. (0.025 mole) of conc. sulfuric acid. Diethyl ketone (8.6 g.; 0.1 mole) was then added dropwise with constant stirring in the course of 20 min. and the mixture stirred at 0° C. for 3.5 hrs. longer. The mixture was then extracted with 200 cc. of petroleum ether and the extract shaken with 2 x 100 cc. of saturated ammonium sulfate solution follower by four times with water and dried over magnesium sulfate. The dried mixture was filtered and the petroleum ether removed at room temperature under reduced pressure (50 mm.). Using a dry stream of air, the residue was subjected to a high vacuum (0.2–0.3 mm.) and at 35–40° C. A paper chromatogram of the final residue (55–60% based on the ketone used) showed the presence of six peroxides with peroxide IIC as the main product (85%).

The crude mixture was redissolved in dry petroleum ether (1:1) and, with proper protection from moisture, cooled to −70° C. whereby voluminous crystals separated out. The supernatant liquid was carefully decanted and the crystallization repeated three times. A paper chromatogram of the final crystals showed the presence of peroxide IIC contaminated with traces of the cyclic peroxide VIIC.

(cyclic peroxide VIIC structure, with $C_2H_5$ groups and OO linkages)

For final purification the crystals were sublimed in vacuum (3 mm.) and at 55–60° C. and the sublimate, M.P. 30.6° C., showed a single spot on the paper chromatogram with an $R_f$ 0.53.

*Analysis.*—Calcd. for $C_{10}H_{22}O_6$: C, 50.38; H, 9.31; (O), 20.15; M.W., 238. Found: C, 50.49; H, 9.13; (O), 19.91; M.W. 227 (in exaltone).

The infrared spectrum of this peroxide 10% in chloroform showed the following bands in cm.$^{-1}$; the number in parenthesis gives the intensity of each band: 3480 (8); 3000 (7.5); 2920 (6); 1465 (7.5); 1445 (6); 1410 (4); 1380 (7); 1350 (4); 1335 (3.5); 1280 (4); 1210–1235 (4); 1155 (7); 1130 (6.5); 1120 (5.5); 1070 (3.5); 1045 (3); 1015 (2); 970 (8.5); 920 (7.5); 905 (5); 860 (4).

Using the procedure of Brewster and Cotte, Jr. (JACS, 77, 6214 (1955)), the bis-p-nitrobenzoate of peroxide IIC was prepared; M.P. 121° C. (dec.) from ethyl alcohol.

*Analysis.*—Calcd. for $C_{24}H_{28}N_2O_{12}$: C, 53.74; H, 5.26; N, 5.22. Found: C, 54.39; H, 5.43; N, 5.22.

3,3-dihydroperoxypentane IC

$$HOO-\underset{C_2H_5}{\underset{|}{C}}-OOH$$
(with $C_2H_5$ on C)

The mother liquors from the removal of most of peroxide IIC were combined and the solvent removed in vacuum. A paper chromatogram of the residue showed the presence of six peroxides.

When the residue from the mother liquors was dissolved in dry petroleum ether and the solution cooled to −70° C. no solid separated out, but when moist air was allowed to pass through the solution for a short time a colorless crystalline product separated out which was removed and dried in air at room temperature; M.P. 44°. A paper chromatogram of this peroxide showed a single spot with an $R_f$ of 0.02.

*Analysis.*—Calcd. for $C_5H_{12}O_2H_4$: C, 39.60; H, 9.15; (O), 20.75; M.W., 154. Found: C, 39.33; H, 9.44; (O), 21.02; M.W., 131 (in exaltone).

That this peroxide was the monohydrate of peroxide

IC was shown by drying the crystals in vacuum over phosphorus pentoxide for several hours whereby they lost the water and became a colorless oil.

*Analysis.*—Calcd. for $C_5H_{12}O_4$: C, 44.08; H, 8.89; (O), 23.51. Found: C, 43.93; H, 9.02; (O), 23.61.

When the oil was dissolved in dry petroleum ether and moist air was passed through the solution a crystalline solid separated out which gave the same M.P. as the original peroxide, and mixed M.P. gave no depression.

The infrared spectrum of the crystalline peroxide 10% in chloroform showed the following bands in cm.$^{-1}$: 3620 (4); 3400 (8.5); 3000 (4.5); 2920 (4.5); 1610 (3.5); 1460 (7); 1445 (6); 1378 (5); 1345 (5.6); 1335 (5.5); 1290 (3.5); 1275 (3.5); 1210–1235 (4.5); 1155 (5); 1120 (6); 1070 (2.5); 1040 (3); 970 (6); 915 (7); 860 (6).

The bis-p-nitrobenzoate of the above peroxide was prepared using the same method as that used with peroxide IIC; M.P. 127–128° C. (dec.) from absolute ethyl alcohol.

*Analysis.*—Calcd. for $C_{19}H_{18}N_2O_{10}$: C, 52.53; H, 4.17; N, 6.45; (O), 7.39. Found: C, 52.82; H, 4.16; N, 6.62; (O), 7.00.

3,3-dihydroperoxypentane was also obtained as the main peroxide in about 2% yield with traces of peroxides VIIC and IIC from an equimolecular mixture of diethyl ketone and 50% hydrogen peroxide. The organic peroxides together with the unreacted ketone were extracted with pentane, the extract shaken with saturated solution of ammonium sulfate to remove the free hydrogen peroxide, dried and the solvent and unreacted ketone removed in vacuum. The residue was dissolved in pentane and crystallized at low temperatures using the technique previously described, M.P. 44° C.

This peroxide was also obtained as the sole peroxide when equimolecular quantities of diethyl ketone and hydrogen peroxide in anhydrous t-butyl alcohol or ethyl ether were allowed to stand for several days at room temperature. The reaction mixtures were worked up; the free hydrogen peroxide removed in the usual manner and the final product chromatographed. Only a single spot corresponding to that produced by peroxide IC was observed on the paper chromatogram.

*Decomposition of peroxide IC at room temperature.*— In a special tube filled with pure nitrogen and attached to a calibrated burette with a bulb filled with saturated salt solution was placed 120.7 mg. of pure crystalline peroxide IC. After three weeks of standing at room temperature the solid gradually became liquid and the gas (5.04 cc. or 7.21 mg. at N.T.P) evolved was found to be pure oxygen. The theoretical amount of oxygen corresponding to the reaction described in column 3 is 6.27 mg. A paper chromatogram of the residue showed the presence of peroxide IIC as the main product with peroxides IVC, IIIC and 3-hydroxy-3′-hydroperoxy-3,3′-dipentylperoxide as by-products. The formation of the by-products accounts for the extra oxygen evolved.

*1,1,4,4,7,7 - hexaethyl - 1,4,7 - cyclononatriperoxane (VIIC).*—The solvent from the mother liquors, after most of peroxides IIC and IC had been separated, was removed in vacuum and the viscous residue dissolved in methyl alcohol and cooled to −70° C. A white solid separated out which was recrystallized several times from methyl alcohol; M.P. 58–59° C. This peroxide fails to react with potassium iodide in glacial acetic acid. However, it gives normal active oxygen values with hydrogen iodide in glacial acetic acid. A paper chromatogram using hydrogen iodide-glacial acetic acid as the spraying agent gave a single spot with an $R_f$ of 0.91.

*Analysis.*—Calcd. for $C_{15}H_{30}O_6$: C, 58.78; H, 9.87; (O), 15.67; M.W., 306. Found: C, 58.52; H, 9.87; (O), 15.20; M.W., 302 (in exaltone).

The infrared spectrum 10% in chloroform showed the following bands in cm.$^{-1}$: 3000 (7.5); 2920 (4.5); 1460 (7.5); 1445 (6); 1375 (3); 1345 (4.5); 1335 (4.5); 1280 (5); 1210–1250 (5); 1165 (8); 1140 (8); 1070 (3.5); 1050 (3.5); 1020 (3.5); 980 (8.5); 960 (6.5); 930 (7.5).

*1,1,4,4,7,7,10,10 - octaethyl - 1,4,7 - triperoxy - 1,10 - dihydroperoxide (IVC).*—After most of peroxides VIIC, IIC and IC had been removed from the original mixture by standard procedures, the following procedure was effective for the separation of all peroxides present in the final mother liquors. The solvent from these liquors was removed in vacuum and the residue dissolved in pentane (1:1). A column was prepared as follows: Cellulose powder (300 g., Whatman standard grade) was impregnated with 100 g. of dimethyl formamide in 600 cc. of ethyl ether. The ether was then evaporated at 50° C. and the impregnated cellulose washed once with pentane saturated with dimethyl formamide. The cellulose was then pressed into a column (1.6 x 40 cm.) by pounding with a thick glass rod flattened and flanged at the bottom. The cellulose was held down by a heavy weight of mercury or lead sealed into a glass tube. Before fixing the peroxides on the column the cellulose was washed once again with pentane saturated with dimethylformamide. The peroxide mixture in pentane was then dropped on the top of the column and pentane saturated with dimethylformamide passed through the column at the rate of 3.2–3.3 cc. per min. Ten cc. fractions were collected and examined by paper chromatography. The first few fractions contained peroxide VIIC. After this, peroxide IVC

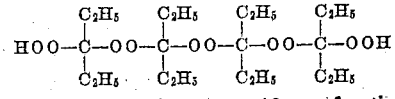

began to come out. Thirty-two 10 cc. fractions which contained this peroxide were combined and concentrated in vacuum to about 30 cc. which was washed several times with water to remove the dimethyl formamide, dried and the solvent removed in vacuum. A semi-solid separated out which was recrystallized at low temperatures and the crystals subjected to a vacuum over phosphorus pentoxide; M.P. 69–70° C. This peroxide gave a single spot on the paper with an $R_f$ of 0.86.

*Analysis.*—Calcd. for $C_{20}H_{42}O_{10}$: C, 54.29; H, 9.59; (O), 18.10; M.W., 442.5. Found: C, 54.45; H, 9.65; (O) 18.44; M.W., 461 (in exaltone).

The infrared spectrum 10% in chloroform showed the following bands in cm.$^{-1}$: 3480 (6.5); 3000 (7.5); 2920 (4.5); 1465 (7); 1450 (6.5); 1380 (5.5); 1350 (5.5); 1275 (4.5); 1210–1235 (5); 1155 (6.5); 1130 (7); 1070 (3.5); 1045 (4); 1015 (3); 960–975 (6.5); 905–920 (8); 865 (4).

1,1,4,4,7,7-hexaethyl-1,4-diperoxy-1,7-dihydroperoxide (IIIC)

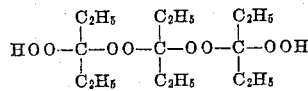

From several chromatographic separations, fractions which were collected immediately after those containing peroxide IVC, and which showed a single spot on the paper chromatogram with an $R_f$ 0.70, were combined, the dimethyl formamide washed away as before and the pentane solution dried and the solvent removed in vacuum. A small amount of peroxide IIIC was obtained which could not be crystallized.

*Analysis.*—Calcd. for $C_{15}H_{32}O_8$: (O), 18.82. Found: (O), 19.00.

I claim:

1. Organic peroxides of the formula

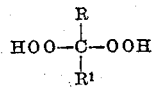

wherein R and $R^1$ are lower alkyl groups.

2. 2,2-dihydroperoxypropane.

3. 2,2-dihydroperoxybutane.

4. 3,3-dihydroperoxypentane.
5. Organic peroxides of the formula

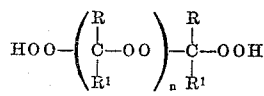

wherein R and R¹ are lower alkyl groups and $n$ is a whole number from 2 to 5.

6. A method of making organic peroxides of the formula

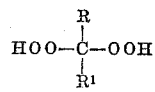

wherein R and R¹ are lower alkyl groups which comprises allowing a mixture of substantially equimolecular amounts of hydrogen peroxide and a lower dialkyl ketone to react in substantially equimolecular amounts in the substantial absence of hydrogen ions.

7. A method of separating organic peroxides of the formula

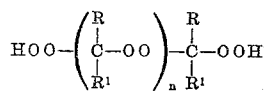

wherein R and R¹ are lower alkyl groups and $n$ is a whole number from 0 to 5 from the reaction products of hydrogen peroxide on lower dialkylketones which comprises adsorbing the organic peroxide products on cellulose powder and differentially eluting the organic products with a normally liquid alkane solvent.

8. A method of separating organic peroxides of the formula

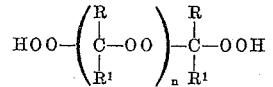

wherein R and R¹ are lower alkyl groups and $n$ is a whole number from 0 to 5 from the reaction products of hydrogen peroxide on lower dialkylketones which comprises adsorbing the organic peroxide products on cellulose powder and differentially eluting the organic products with pentane saturated with dimethylformamide.

References Cited in the file of this patent
UNITED STATES PATENTS 2,605,290     Robertson et al.           July 29, 1952

OTHER REFERENCES

Criegee et al.: Ber. Duet. Chem., vol. 89 (1956), 1714–18 (5 pages).
Criegee et al.: Chem. Abstracts, vol. 51 (1957), 5690 (1 page).
Milas et al.: Jour. Amer. Chem. Soc., vol. 81 (1959), 3359–61 (3 pages).
Milas et al.: Jour. Amer. Chem. Soc., vol. 81 (1959), 3361–64 (4 pages).